United States Patent
Sugimoto et al.

(10) Patent No.: US 8,654,358 B2
(45) Date of Patent: Feb. 18, 2014

(54) IMAGE DATA PROCESSING DEVICE INCLUDING IMAGE DATA TREATING UNITS

(75) Inventors: Noriko Sugimoto, Konan (JP); Tatsuya Sato, Ichinomiya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1167 days.

(21) Appl. No.: 12/033,800

(22) Filed: Feb. 19, 2008

(65) Prior Publication Data

US 2008/0204783 A1 Aug. 28, 2008

(30) Foreign Application Priority Data

Feb. 28, 2007 (JP) .................. 2007-050855

(51) Int. Cl.
*G06F 3/12* (2006.01)

(52) U.S. Cl.
USPC .......... 358/1.13; 358/1.2; 358/1.4; 358/1.6; 358/1.9; 358/1.15; 358/1.16; 358/1.18; 358/2.1; 358/520

(58) Field of Classification Search
None
See application file for complete search history.

(56) References Cited

U.S. PATENT DOCUMENTS

| | | | |
|---|---|---|---|
| 6,449,059 B1 * | 9/2002 | Asada | 358/1.2 |
| 7,057,747 B1 | 6/2006 | Minagawa | |
| 7,983,943 B2 * | 7/2011 | Morales et al. | 705/7.27 |
| 2003/0218762 A1 * | 11/2003 | Edwards et al. | 358/1.2 |
| 2005/0038530 A1 * | 2/2005 | Nagasaka et al. | 700/19 |
| 2005/0041261 A1 * | 2/2005 | Narushima et al. | 358/1.9 |
| 2007/0046994 A1 * | 3/2007 | Morales et al. | 358/1.16 |
| 2013/0169986 A1 * | 7/2013 | Lee et al. | 358/1.13 |

FOREIGN PATENT DOCUMENTS

| | | |
|---|---|---|
| JP | H09-86015 A | 3/1997 |
| JP | 2000222159 A | 8/2000 |
| JP | 2005316053 A | 11/2005 |

* cited by examiner

*Primary Examiner* — Miya J Cato
(74) *Attorney, Agent, or Firm* — Baker Botts L.L.P.

(57) ABSTRACT

An image data processing device includes a plurality of image data treating units, a storing unit, and a setting unit. The plurality of image data treating units treats image data. The storing unit stores a plurality of conditions relating to a property of image data to be treated by each of the image data treating units. The setting unit is configured to set a condition in the storing unit to each of at least two of the image data treating units at a time. The conditions set to the at least two of the image data treating units is associated with one another so that the at least two of the image data treating units treat image data with same concept of processing.

14 Claims, 13 Drawing Sheets

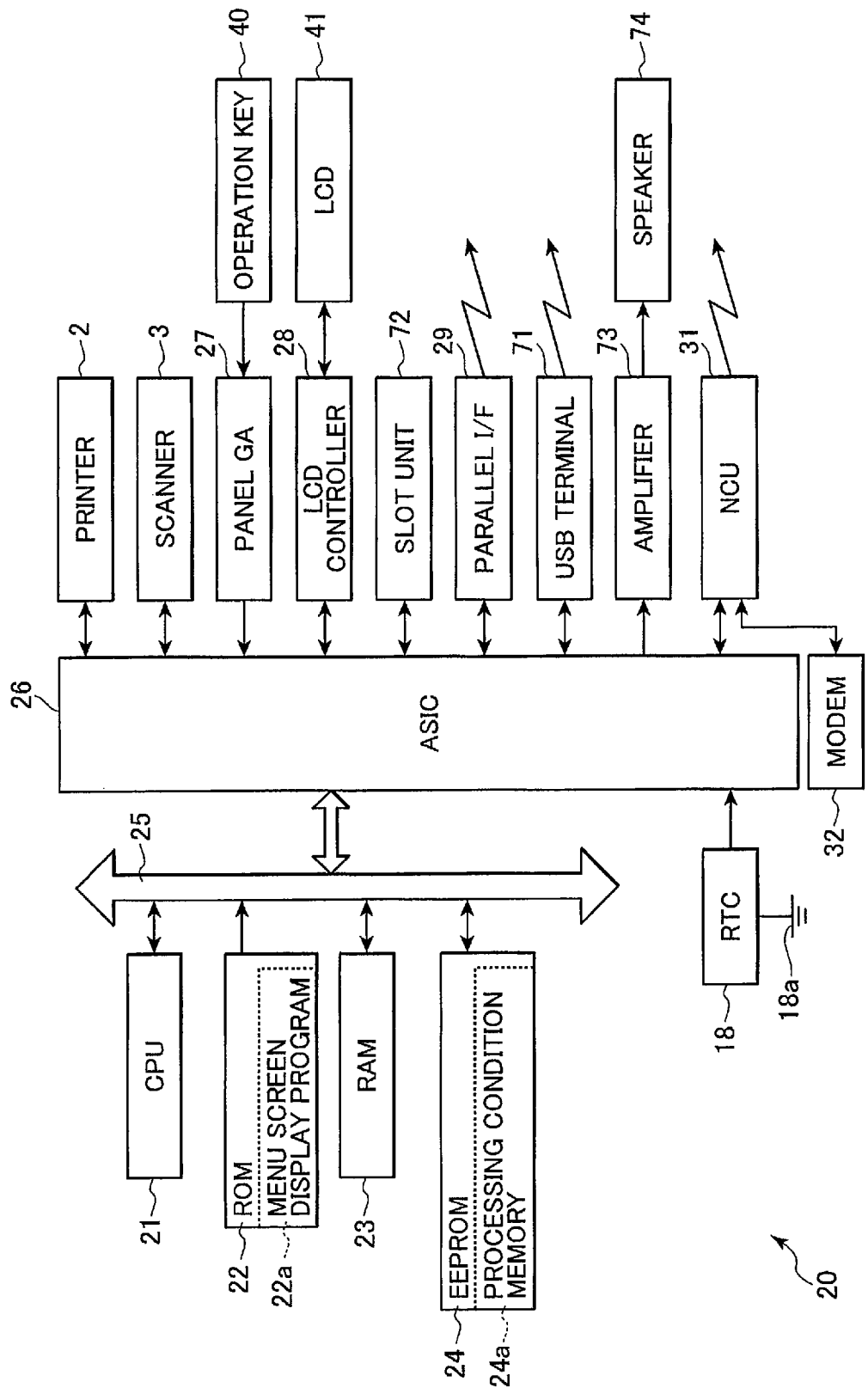

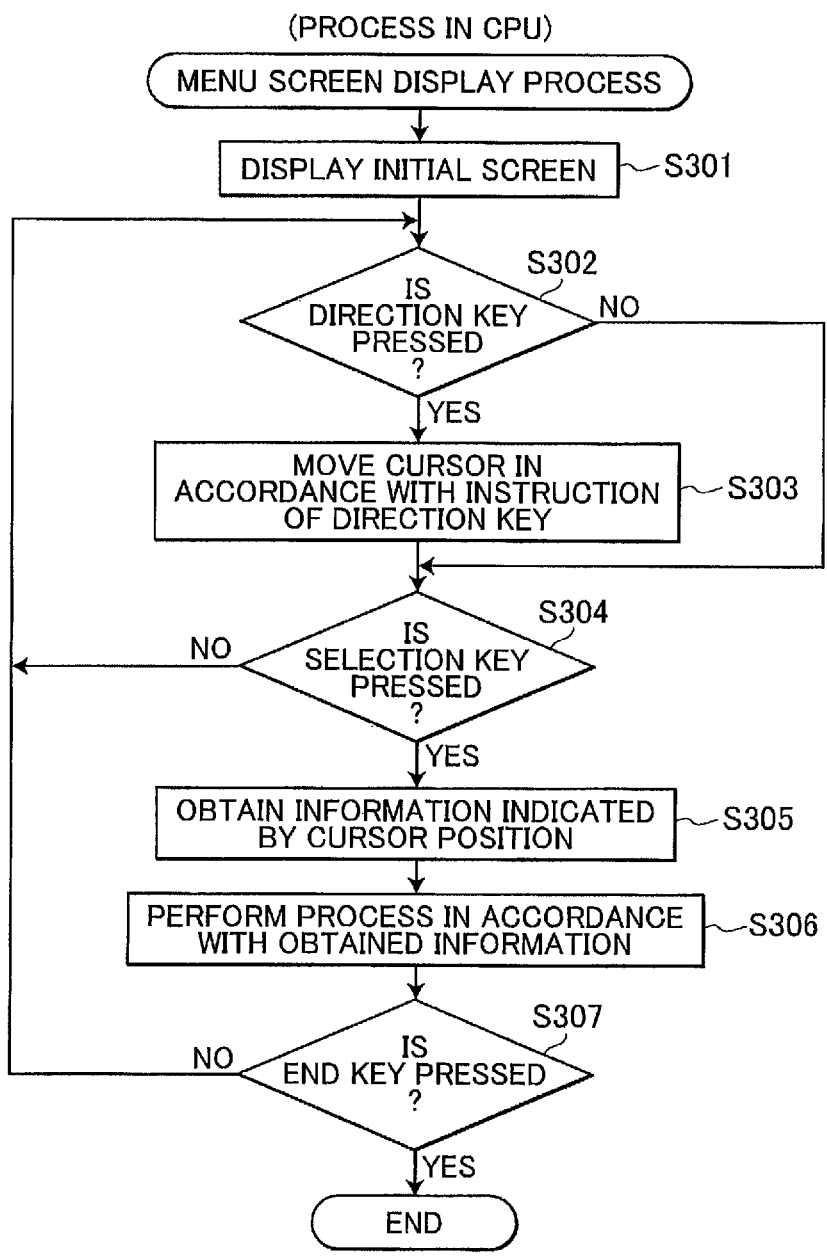

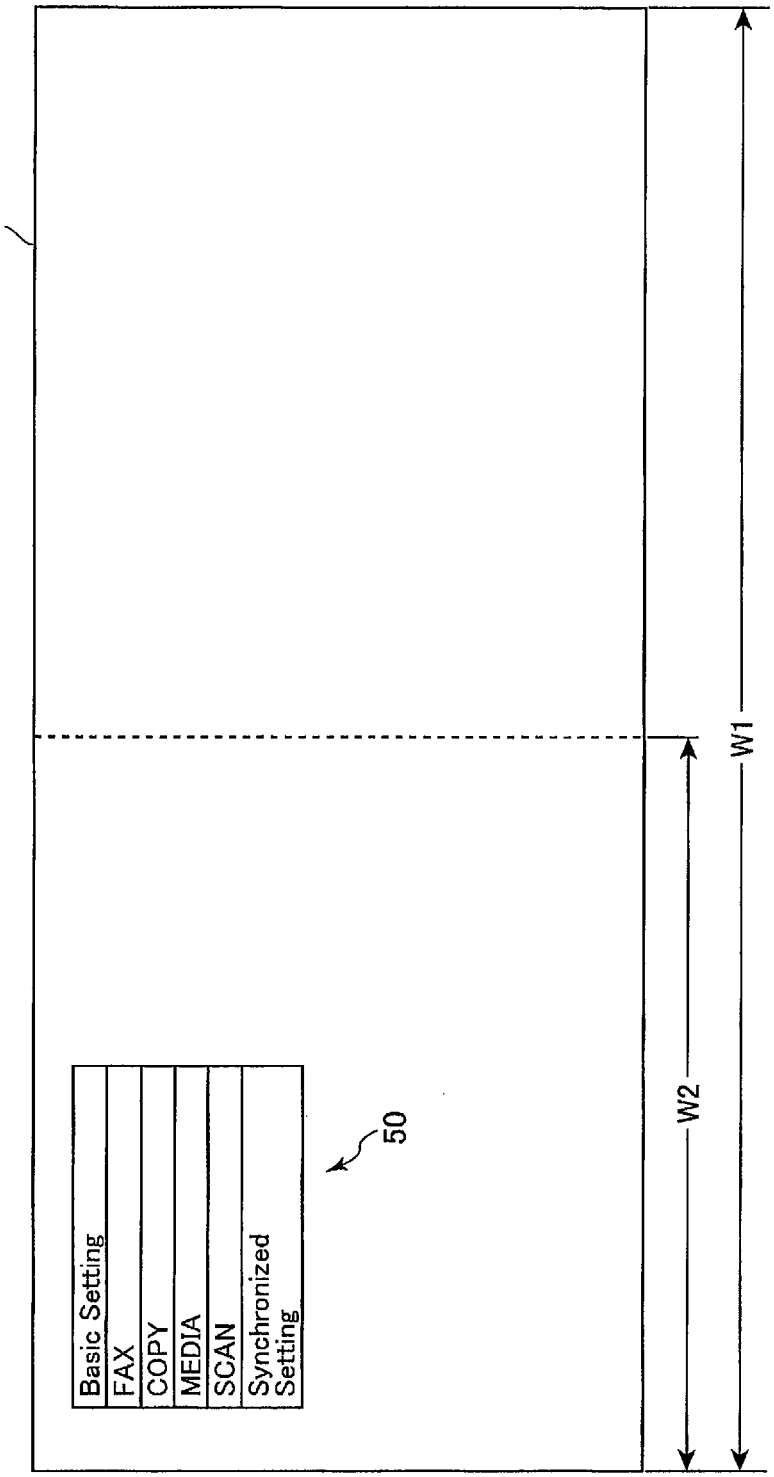

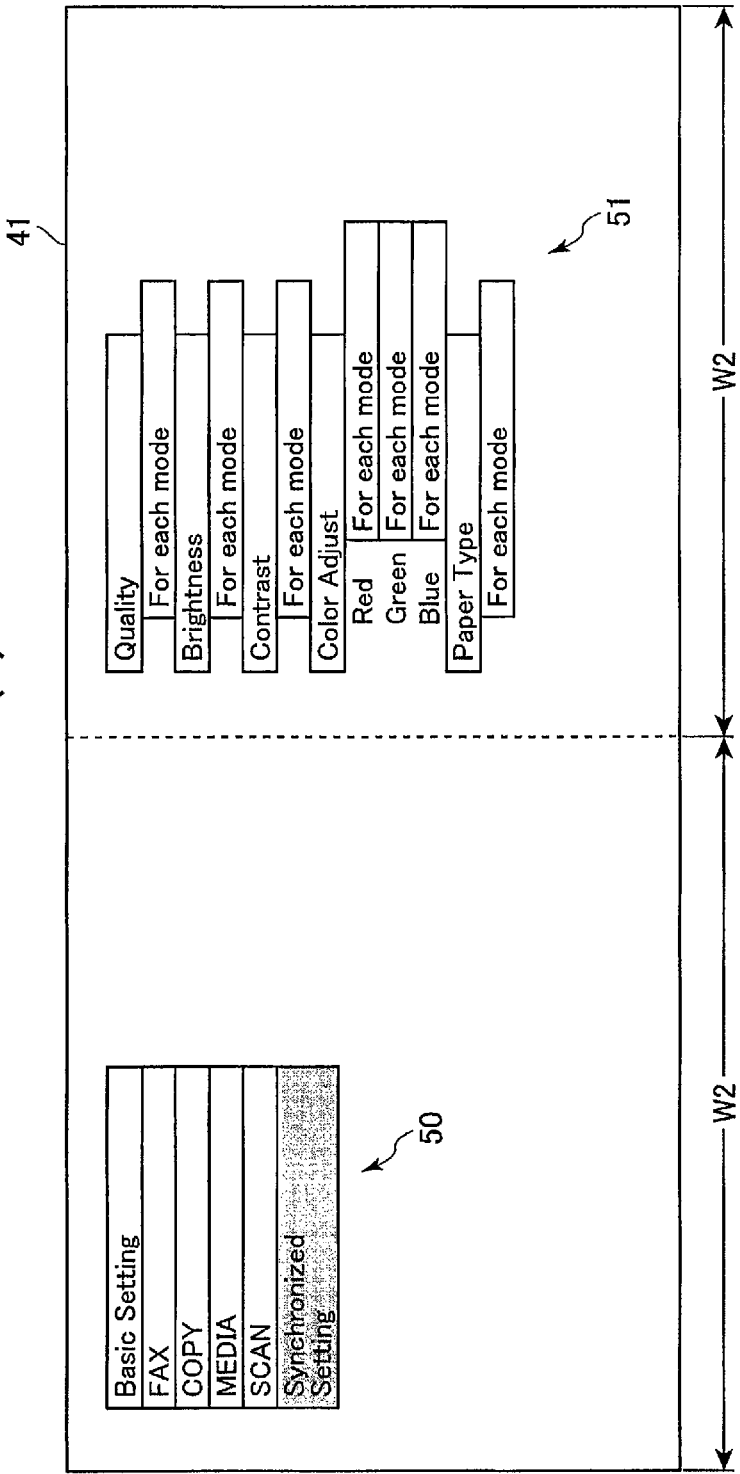

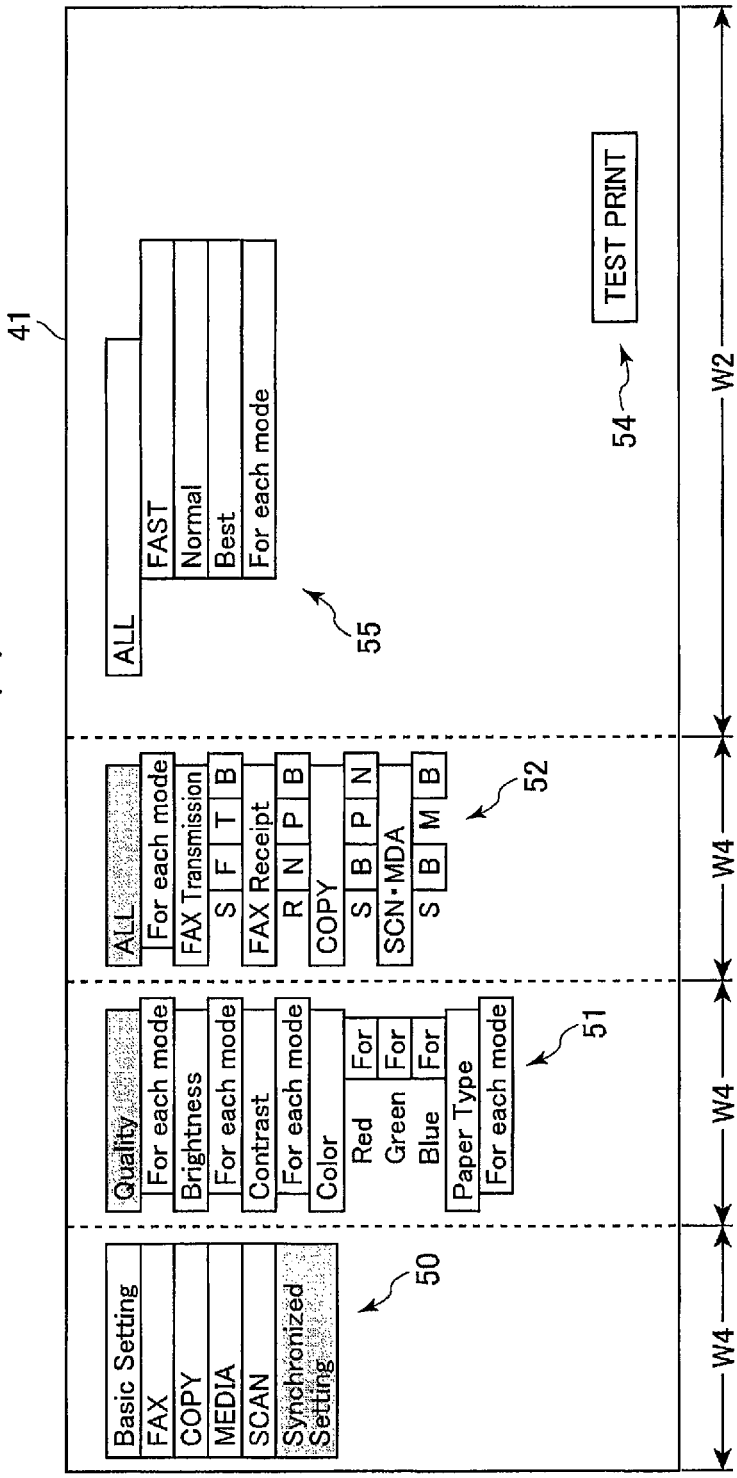

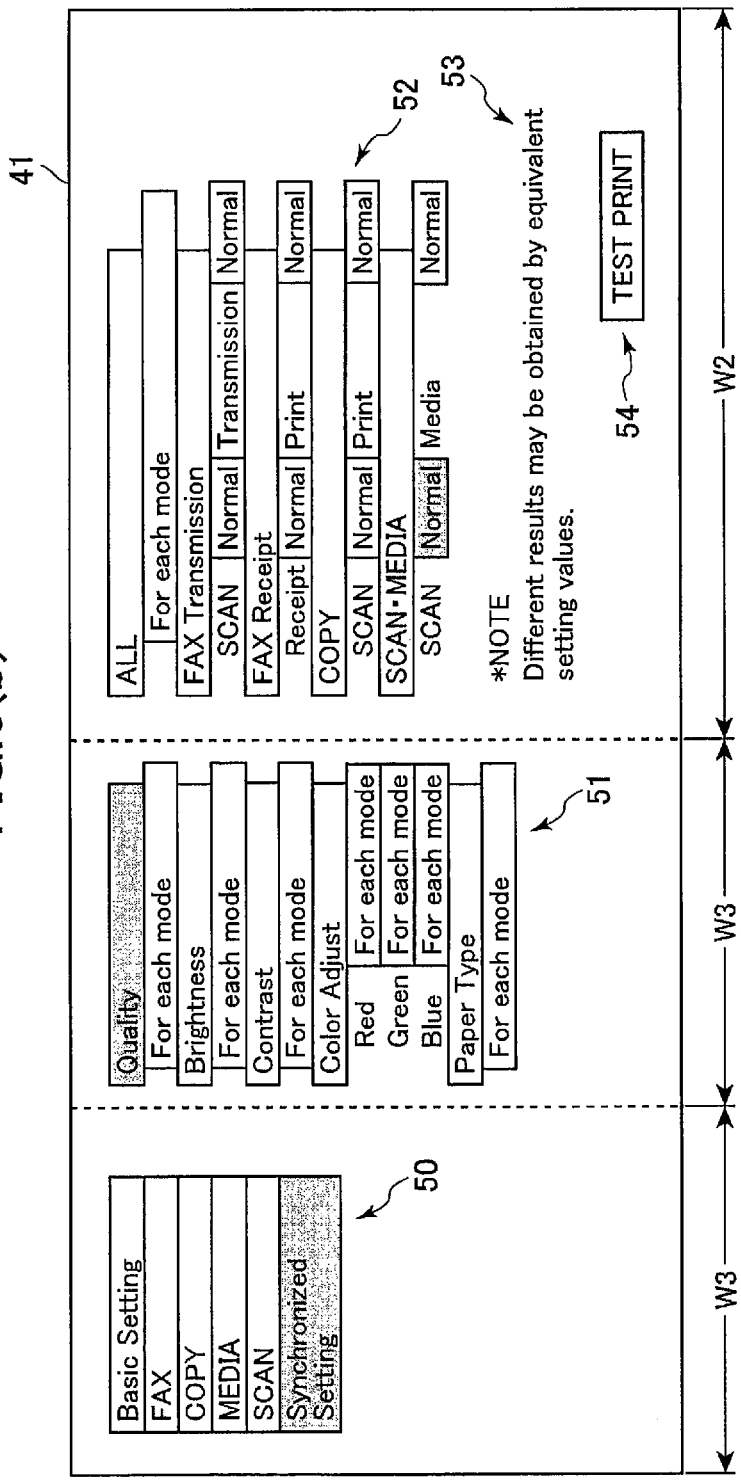

IMAGE DATA PROCESSING DEVICE INCLUDING IMAGE DATA TREATING UNITS

CROSS REFERENCE TO RELATED APPLICATION

This application claims priority from Japanese Patent Application No. 2007-050855 filed Feb. 28, 2007. The entire content of this priority application is incorporated herein by reference.

TECHNICAL FIELD

The present invention relates to an image data processing device. In particular, the present invention relates to an image data processing device capable of setting each processing condition with respect to a plurality of functions to the same processing condition easily without an error.

BACKGROUND

A multifunction device called a multifunction product (MFP) including a plurality of functions, such as a print function, a copy function, a scan function, and a facsimile function, has been conventionally known. In this multifunction device, processing conditions (for example, a resolution, brightness, a tone, and a type of a recording medium) in each function can be arbitrary set.

In setting of the processing conditions of each function, for example, first, a function selecting screen is displayed. The user can select a desired function from a plurality of functions on the function selecting screen. When the user selects a desired function, next, a processing condition selection screen is displayed. On the processing condition selection screen, the user can select a processing condition of the selected function. Then, the user is allowed to select a desired processing condition. Accordingly, the user can set arbitrary the processing condition in each function.

Japanese Patent Application Publication No. 2005-316053 (paragraph [0005]) discloses a technique that when the user selects a desired function in a function selection screen, processing conditions for the desired function are changed collectively to the default processing conditions prepared in advance.

SUMMARY

An object of the present invention is to provide an image data processing device capable of setting each processing condition with respect to a plurality of functions to the same processing condition easily without an error.

In view of the foregoing, it is an object of the invention to provide an image data processing device. The image data processing device includes a plurality of image data treating units, a storing unit, and a setting unit. The plurality of image data treating units treats image data. The storing unit stores a plurality of conditions relating to a property of image data to be treated by each of the image data treating units. The setting unit is configured to set a condition in the storing unit to each of at least two of the image data treating units at a time. The conditions set to the at least two of the image data treating units is associated with one another so that the at least two of the image data treating units treat image data with same concept of processing.

BRIEF DESCRIPTION OF THE DRAWINGS

In the drawings:

FIG. 2 is a block diagram showing the schematic configuration of a control unit of the multifunction device;

FIG. 3 is a flowchart showing a menu screen display process;

FIG. 4(a) is a diagram showing a screen on a LCD displaying an initial menu list;

FIG. 4(b) is a diagram showing a screen of the LCD displaying a lower layer list of "Synchronized Setting" on the right side of the initial menu list;

FIG. 5(b) is a diagram showing a screen of the LCD displaying a lower layer list of "ALL" on the right of the lower layer list of "Quality";

FIG. 6(b) is a diagram showing a screen of the LCD when a rank of specific function is changed to another rank from the state shown in FIG. 6(a);

FIG. 9(b2) shows a recording paper on which an image of the media setting is recorded.

DETAILED DESCRIPTION

Figure 1:
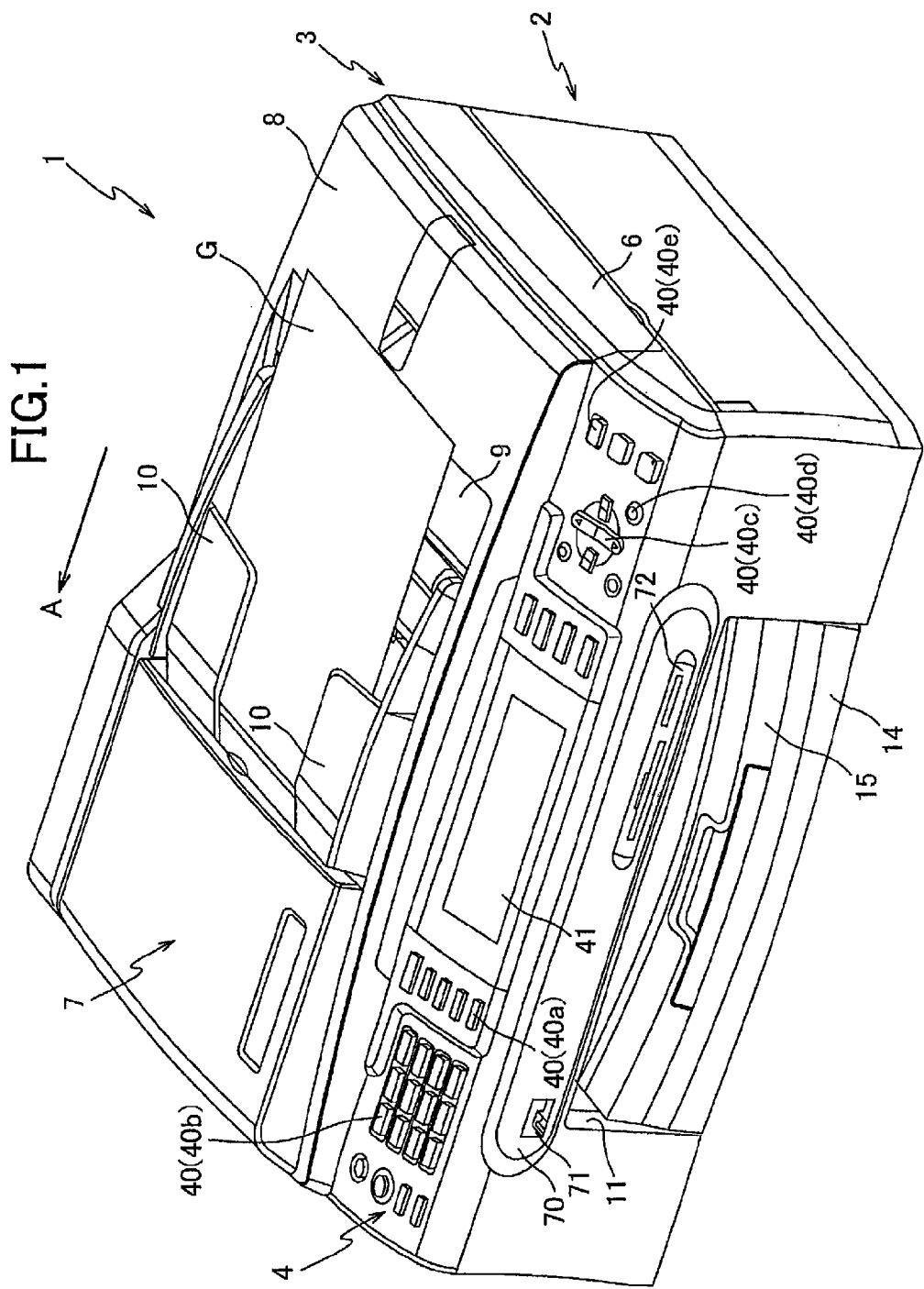
FIG. 1 is a perspective view showing the outer structure of a multifunction device according to an embodiment of the invention.

Next, an embodiment of the invention will be described while referring to the accompanying drawings. FIG. 1 is a perspective view showing an outer structure of a multifunction device 1 according to an embodiment of the invention. As shown in FIG. 1, the multifunction device 1 is a multifunction product, that is, the multifunction device 1 is integrally configured of a printer 2 disposed on the bottom, a scanner 3 disposed on the top, and a control panel 4 provided on the front surface of the scanner 3. The multifunction device 1 implements a scanner function, a copier function, and a facsimile function.

In addition to the above, the multifunction device 1 includes a media function that records, on a recording sheet, data received from an external device which is connected to the multifunction device 1, such as a USB memory, a digital camera, and a personal computer. Also, the multifunction device 1 includes a function to display the data received from the external device on a liquid crystal display (LCD) 41 provided on the control panel 4.

The multifunction device 1 stores, for each of the functions, processing conditions that specify quality of image data or an image handled in the plurality of functions (the scanner function, the copier function, the facsimile function, and the media function). The multifunction device 1 is a devices working as an image data processing device of the invention capable of setting each of the processing conditions with respect to the plurality of functions to the same processing conditions easily without an error.

The scanner 3 includes a document reading unit 6 functioning as a flatbed scanner (FBS), and a document cover 8 for the document reading unit 6. The document cover 8 includes an auto document feeder (hereinafter referred to as "ADF") 7. The document reading unit 6 includes a platen grass on a top surface thereof. The document reading unit 6 includes an image reading unit (not shown) therein. The scanner 3 having the above configuration reads out an image of a document by using the FBS or the ADF 7.

The ADF 7 conveys a document G from a document tray 9 to a document discharge tray 10 through a document conveying path. In a conveying process of the document G by the ADF 7, the document G passes on a reading surface on the document reading unit 6, and an image of the document G is read out by the image reading unit waiting below the reading surface. Such image reading by the ADF 7 is carried out with the document cover 8 covering the document reading unit 6.

The printer 2 records an image on a recording sheet based on the image data read out by the scanner 3 or image data input from the external device. The printer 2 is a so-called ink-jet system image recording device (ink-jet recording device). The above ink-jet system is mere an example of an image recording system of the printer 2. A variety of image recording systems, such as an electrophotographic system and a thermal transfer system, can be adopted as the image recording system of the printer 2.

The multifunction device 1 is formed with an opening 11 on a front side thereof. That is, the opening 11 is formed on a front side of the printer 2. Inside the opening 11, the printer 2 includes a paper feed tray 14 and a paper ejection tray 15 which is disposed on top of the paper feed tray 14.

In addition, the multifunction device 1 has the control panel 4 on the front side thereof. The control panel 4 is used for operating the printer 2 and the scanner 3. The panel 4 includes a variety of operation keys 40 (40a, 40b, 40c, 40d, and 40e) and the LCD 41.

Among the variety of operation keys 40 (40a, 40b, 40c, 40d, and 40e), the operation key 40a is a menu screen control key 40a used for displaying a menu screen (see FIG. 4(a)) on the LCD 41 of the multifunction device 1. The operation keys 40b are numerical keys 40b used for inputting numbers and signs. The operation keys 40c are direction keys 40c used for instructing movement of a cursor displayed on the LCD 41. The operation key 40d is a selection key 40d used for instructing selection of information indicated by the cursor, for example. The operation key 40e is an end key 40e used for instructing an end of the menu screen.

The LCD 41 is formed in a rectangular shape with a longitudinal direction (width direction) parallel to an arrow A direction. The LCD 41 has an aspect ratio of 3:8 where the vertical direction is 3 and the width direction is 8. More specifically, two independent LCDs having a rectangular shape with an aspect ratio of 3:4 are integrally disposed adjacent to each other in the arrow A direction. Here, the vertical direction is 3 and the width direction of the independent LCD is 4. However, in FIG. 1, the LCD 41 is illustrated by omitting such a detail.

As shown in FIG. 2, the multifunction device 1 includes a control unit 20 therein. When a prescribed instruction is input to the multifunction device 1, operation of the device 1 is controlled by the control unit 20 based on the instruction being input. The multifunction device 1 is capable of performing based on an instruction transmitted from a computer via a printer driver or a scanner driver, in addition to an instruction inputted from the control panel 4.

The multifunction device 1 includes a connection panel 70. The connection panel 70 is provided below the control panel 4 and above the opening 11. The connection panel 70 includes a USB terminal 71 and a slot unit 72. The USB terminal 71 is provided on a left side edge of the connection panel 70. The USB terminal 71 is a connector terminal that connects an external device by USB connection. Accordingly, the USB terminal 71 connects the multifunction device 1 to the external device in a communicable manner.

The connection panel 70 includes the slot unit 72 a right side edge thereof. The slot unit 72 includes a plurality of card slots. The card slots can be loaded with a memory card (card type memory). When the memory card is loaded in the card slot and image data is read out from the loaded memory card by the control unit 20, which will be described later, the read-out image data and information relating to the image data are displayed on the LCD 41 by the control unit 20 (see FIG. 2). Alternatively, an image that is selected arbitrary is recorded by the printer 2 on a recording sheet.

A schematic configuration of the control unit 20 is described with reference to FIG. 2. FIG. 2 is a block diagram showing the schematic configuration of the control unit 20 of the multifunction device 1. The control unit 20 integrally controls operation of the multifunction device 1 including the printer 2, the scanner 3, and the control panel 4.

As shown in FIG. 2, the control unit 20 is configured of a microcomputer primarily including a central processing unit (CPU) 21, a read-only memory (ROM) 22, a random access memory (RAM) 23, and an electrically erasable and programmable ROM (EEPROM) 24, which is a rewritable, nonvolatile storage device. The control unit 20 is connected to an application specific integrated circuit (ASIC) 26 via a bus 25.

The CPU 21 is a central processing unit that controls integrally the multifunction device 1 in accordance with a program stored in the ROM 22. The ROM 22 stores a program for controlling various operations of the multifunction device 1. For example, the ROM 22 stores a menu screen display control program 22a as a program for executing menu screen display process as shown in FIG. 3.

The RAM 23 is used as a storage area or a working area that temporarily stores various data used when the CPU 21 executes the program.

The EEPROM 24 is a rewritable non-volatile memory, and provided with a processing condition memory 24a. The processing condition memory 24a stores the processing conditions that specify, for each of the plurality of functions (the facsimile function, the copy function, the scanner function, and the media function) equipped in the multifunction device 1, quality of image data or an image handled in each of the functions.

The processing conditions include a resolution, brightness, a density, and a hue. Each of the resolution, the brightness, the density and the hue, is ranked as any of three ranks, "Fast", "Normal", and "Best" in the order from lower image quality. That is, the EEPROM 24 stores the processing conditions specifying their ranks. In other words, the EEPROM 24 stores the resolutions for "Fast" rank, "Normal" rank, and "Best" rank, values of brightness for "Fast" rank, "Normal" rank, and "Best" rank, the densities for "Fast" rank, "Normal" rank, and "Best" rank, and the hues for "Fast" rank, "Normal" rank, and "Best" rank.

In addition, the facsimile function and the copy functions are classified, and a rank of each of the processing conditions is stored for each of the classified functions as described below.

The facsimile function is classified into a scanner function for FAX, a facsimile transmission function, a facsimile receipt function, and a print function for FAX. The scanner function for FAX creates image data to be transmitted as facsimile data. The facsimile transmission function transmits the image data created by the scanner function for FAX as the facsimile data. The facsimile receipt function receives the facsimile data. The print function for FAX records the facsimile data received by the facsimile receipt function on recording paper P. The rank ("Fast", "Normal", and "Best") of each of the processing conditions (the resolution, the brightness, the density and the hue) is stored for each of the classified functions.

The copy function is classified into a scanner function for copy, and a print function for copy. The scanner function for copy creates image data of an image on a document. The print function for copy records an image based on the image data created by the scanner function for copy on the recording paper P. The rank ("Fast", "Normal", and "Best") of each of the processing conditions (the resolution, the brightness, the density and the hue) is stored for each of the classified functions.

The ranks of the processing conditions for each of the functions stored in the processing condition memory 24a are updated or read out corresponding to an instruction of the user in a menu screen display process (described later), and displayed on the LCD 41.

In other words, the processing condition memory 24a stores the processing condition (a resolution, brightness, a hue, for example) classified into the rank for each function.

The ASIC 26 is connected to the printer 2, the scanner 3, a panel gate array 27 (panel GA 27), an LCD controller 28, the slot unit 72, a parallel interface 29 (parallel I/F 29), the USB terminal 71, a speaker 74 through an amplifier 73, a network control unit (NCU) 31, and a real time clock (RTC) 18. The ASIC 26 controls operation of the printer 2, the scanner 3, the control panel 4, and the slot unit 72 in accordance with an instruction from the CPU 21. (For example, the ASIC 26 controls operation of a motor (not shown) that drives the printer 2, an ink-jet recording head (not shown), a motor (not shown) that drives the ADF 7 of the scanner 3, and that controls the image reading unit (not shown).) Since the printer 2, the scanner 3, and the slot unit 72 have well known in the art, thus detailed description for these devices is omitted.

The panel GA 27 controls the operation key 40 that inputs a desired instruction to the multifunction device 1. The LCD controller 28 controls screen display of the LCD 41. The parallel I/F 29 is used for sending and receiving data with an external computer via a parallel cable or a USB cable. The RTC 18 is a chip exclusively used for a clock. The RTC 18 is connected to a battery 18a capable of being activated even while the main power of the multifunction device 1 is not supplied.

The NCU 31 is connected to a modem 32. The NCU 31 is used for controlling a line, and is connected to a telephone line. The NCU 31 receives a call signal and a variety of signals sent from a telephone switchboard. In addition, the NCU 31 sends a dialing signal at the time of signal transmission corresponding to operation of the operation key 40 to the telephone switchboard. Also, the NCU 31 performs data communication such as sending and receiving of an analog sound signal when the telephone line is closed.

The modem 32 executes modulation and demodulation of facsimile data and electronic mail data. In addition, the modem 32 sends and receives various procedure signals for controlling transmission. The facsimile data is sent and received in accordance with a facsimile procedure by the NCU 31 and the modem 32.

Next, the menu screen display process will be described with reference to FIG. 3. FIG. 3 is a flowchart showing the menu screen display process.

The menu screen display process is a process for mainly setting the processing conditions for each of the functions equipped in the multifunction device 1. The CPU 21 executes the menu screen display process in accordance with the menu screen control program 22a when the user presses the menu screen display key 40a.

In the menu screen display process, when the menu screen display key 40a is pressed, first, in S301, an initial screen is displayed on the LCD 41. Next, in S302, the CPU 21 determines whether or not the user presses the direction keys 40c. If the user presses the direction keys 40c (S302: Yes), in S303 the CPU 21 controls the cursor to move in accordance with an instruction from the direction keys 40c. If the direction keys 40c is not pressed (S302: No), the CPU 21 skips S303 and proceeds to S304.

Next, in S304 the CPU 21 determines whether the user presses the selection key 40d. If the selection key 40d is pressed (S304: Yes), in S305 the CPU 21 obtains information indicated by a cursor position, and in S306 the CPU 21 executes process in accordance with the obtained information. If the selection key 40d is not pressed (S304: No), in S302 the CPU 21 returns to S302. Next, in S307 the CPU 21 determines whether the user presses the end key 40e. If the end key 40e is pressed (S307: Yes), the CPU 21 ends the process. If the end key 40e is not pressed (S307: No), the CPU 21 returns to S302.

Next, the process in accordance with the obtained information in S306 will be described specifically with reference to FIGS. 4(a) to 7 which show a screen displayed on the LCD 41. FIG. 4(a) is a diagram showing the initial screen displayed on the LCD 41. The initial screen is displayed on the LCD 41 first when the user presses the menu screen display key 40a.

As shown in FIG. 4(a), the initial screen displays an initial menu list 50 including "Basic Setting", "FAX", "COPY", "MEDIA", "SCAN", and "Synchronized Setting" in this order from the top thereof. The initial menu list 50 is displayed within an area with a width W2 which is substantially half of a total width W1 of the LCD 41.

In the initial menu list 50, "Basic Setting" is a menu that requests setting of basic functions included in the multifunction device 1. In the basic setting, a clock function of the RTC 18, brightness of the LCD 41, a sound level of the speaker 74, and a role of the operation keys 40 (an assignment of the operation keys 40) can be set, for example.

"FAX" is a menu that can set each of the processing conditions of the facsimile function (including the scanner function for FAX, the facsimile transmission function, the facsimile receipt function, and the print function for FAX). "COPY" is a menu that can set each of the processing conditions of the copy function (including the scanner function for copy and the print function for copy). "MEDIA" is a menu that can set each of the processing conditions of the media function. "SCAN" is a menu that can set each of the processing conditions of the scanner function.

"Synchronized Setting" is a menu that can set the processing conditions in each of the facsimile function, the copy function, the media function, and the scanner function to a same rank processing conditions simultaneously.

When the initial menu list 50 is displayed, the user operates the direction keys 40c (up and down directions) to set the cursor at a desired menu. The user presses the selection key

40*d* in a state where the cursor is set at the desired menu. Accordingly, a lower layer list of the selected menu is displayed.

Next, a description will be given with respect to a case where "Synchronized Setting" is selected from the initial menu list 50 shown in FIG. 4(*a*). In this case, as shown in FIG. 4(*b*), a lower layer list 51 of "Synchronized Setting" is displayed on the right side of the initial menu list 50.

The lower layer list 51 of "Synchronized Setting" is displayed in an area of the width W2 which is substantially half of the total width W1 of the LCD 41. In addition, the selected "Synchronized Setting" is highlighted so that the user can check the selected menu at a glance.

The lower layer list 51 of "Synchronized Setting" displays common processing conditions included in each of the functions. That is, the lower layer list 51 displays "Quality" indicating a resolution, "Brightness" indicating brightness, "Contrast" indicating contrast, "Color Adjust" indicating a hue, and "Paper Type" indicating a type of the recording paper P, sequentially from the top.

In addition, "For each mode" is displayed directly below each of the processing conditions. "For each mode" requests setting of the processing conditions for each mode (for each of the functions of the facsimile function, the copy function, the media function, and the scanner function). With respect to "Color Adjust", "For each mode" is displayed for each color of "Red" indicating a red color, "Green" indicating a green color, and "Blue" indicating a blue color.

When the lower layer list 51 of "Synchronized Setting" is displayed, the user operates the direction keys 40*c* (up and down directions) to set the cursor on a desired menu. The user presses the selection key 40*d* in a state where the cursor is set at the desired menu. Accordingly, a lower layer list of the selected menu is displayed.

Next, with reference to FIG. 5(*a*), a description will be given in a case where "Quality" is selected from the lower layer list 51 of "Synchronized Setting" shown FIG. 4(*b*). In this case, as shown in FIG. 5(*a*), a lower layer list 52 of "Quality" is displayed on the right side of the lower layer list 51 of "Synchronized Setting".

The lower layer list 52 of "Quality" is displayed in an area of the width W2 which is substantially half of the total width W1 of the LCD 41. The initial menu list 50 and the lower layer list 51 of "Synchronized Setting" previously displayed are displayed in an area with a width W3 which is substantially quarter of the total width W of the LCD 41. In addition, the selected menus ("Synchronized Setting" in the initial menu list 50 and "Quality" in the lower layer list 52) are highlighted so that the selected menu can be checked at a glance.

The lower layer list 52 of "Quality" displays "ALL", "FAX Transmission", "FAX Receipt", "COPY", and "SCAN/MEDIA" in this order from the top of the LCD 41, as a main menu. "ALL" indicates that a rank of "Quality" is set to be the same rank for each of the functions at a time. "FAX Transmission" indicates the facsimile transmission function. "FAX Receipt" indicates the facsimile receipt function. "COPY" indicates the copy function. "SCAN/MEDIA" indicates the scanner function and the media function.

In addition, "For each mode" is displayed directly below "ALL". "For each mode" indicates setting request for each mode (for each of the functions of the facsimile function, the copy function, the media function, and the scanner function). "SCAN", "Fast", "Transmission", and "Best" are displayed directly below "FAX Transmission" in this order from the left of the lower layer list 52. "SCAN" indicates the scanner function for FAX used in the facsimile transmission function. "Fast" indicates a rank of Quality (resolution) currently set in the scanner function for FAX. "Transmission" indicates the facsimile transmission function. "Best" indicates Quality (resolution) currently set in the facsimile transmission function.

"Receipt", "Normal", "Print", and "Best" are displayed directly below "FAX Receipt" in this order from the left of the lower layer list 52. "Receipt" indicates the facsimile receipt function. "Normal" indicates that a rank of Quality (resolution) is currently set to a normal rank for the facsimile receipt function. "Print" indicates the print function for FAX used in the facsimile receipt function. "Best" indicates that a rank of Quality (resolution) is currently set to a best rank for the print function for FAX.

"SCAN", "Best", "Print", and "Normal" are displayed directly below "COPY" in this order from the left of the lower layer list 52. "SCAN" indicates the scanner function for copy used in the copy function. "Best" indicates a rank of Quality (resolution) currently set in the scanner function. "Print" indicates the print function for copy used in the copy function. "Normal" indicates a rank of Quality (resolution) currently set in the print function for copy.

"SCAN", "Best", "Media", and "Best" are displayed directly below "SCAN/MEDIA" in this order from the left of the lower layer list 52. "SCAN" indicates the scanner function. The first "Best" which is disposed between "SCAN" and "Media" indicates a rank of Quality (resolution) currently set in the scanner function. "Media" indicates the media function. The second "Best" which is disposed on the right of "Media" indicates a rank of Quality (resolution) currently set in the media function.

When "Quality" is selected in the lower layer list 51 of "Synchronized Setting" shown in FIG. 4(*b*), the CPU 21 reads the processing conditions for the functions of the multifunction device 1 from the processing condition memory 24*a* and controls the LCD 41 to display the processing conditions in the lower layer list 52.

In addition, the CPU 21 controls the LCD 41 to display a comment 53 of "*NOTE/Different results may be obtained by equivalent setting values" below the lower layer list 52 of "Quality". The comment 53 is for drawing attention of the user to the fact that, for example, quality of images recorded by the copy function and the media function may be different for the reason of specifications for the functions of the multifunction device 1, even if the rank of "COPY" and the rank of "MEDIA" are set to the same rank.

The reason of specifications for the functions of the multifunction device 1 indicates the reason for design that setting values used are different for each of the functions. That is, setting values used are different for each of the functions since an assumption of representational capability required for the recording paper P or an assumption of an internal resource such as a memory that the printer 2 can use is different between the "COPY" setting and the "MEDIA" setting. In other words, one parameter value, for example a resolution, for one function classified into one rank may be different from one parameter value for another function classified into the one rank. In view of the above, the comment 53 draws attention of the user to the point that quality of recorded images may be different even if the rank of the "COPY" setting and the rank of the "MEDIA" setting are at the same rank, for example.

Further, "Test print" is displayed below the comment 53. "Test print" is a menu for requesting an image to be recorded on the recording paper P under the processing conditions currently set on a test basis. Details of "Test print" will be described later with reference to FIGS. 8 to 9(*b*2).

When the lower layer list 52 of "Quality" is displayed, the user operates the direction keys 40c (up and down directions) to set the cursor on a desired menu. The user presses the selection key 40d in a state where the cursor is set at the desired menu. Accordingly, a lower layer list of the selected menu is displayed.

Figure 5A:
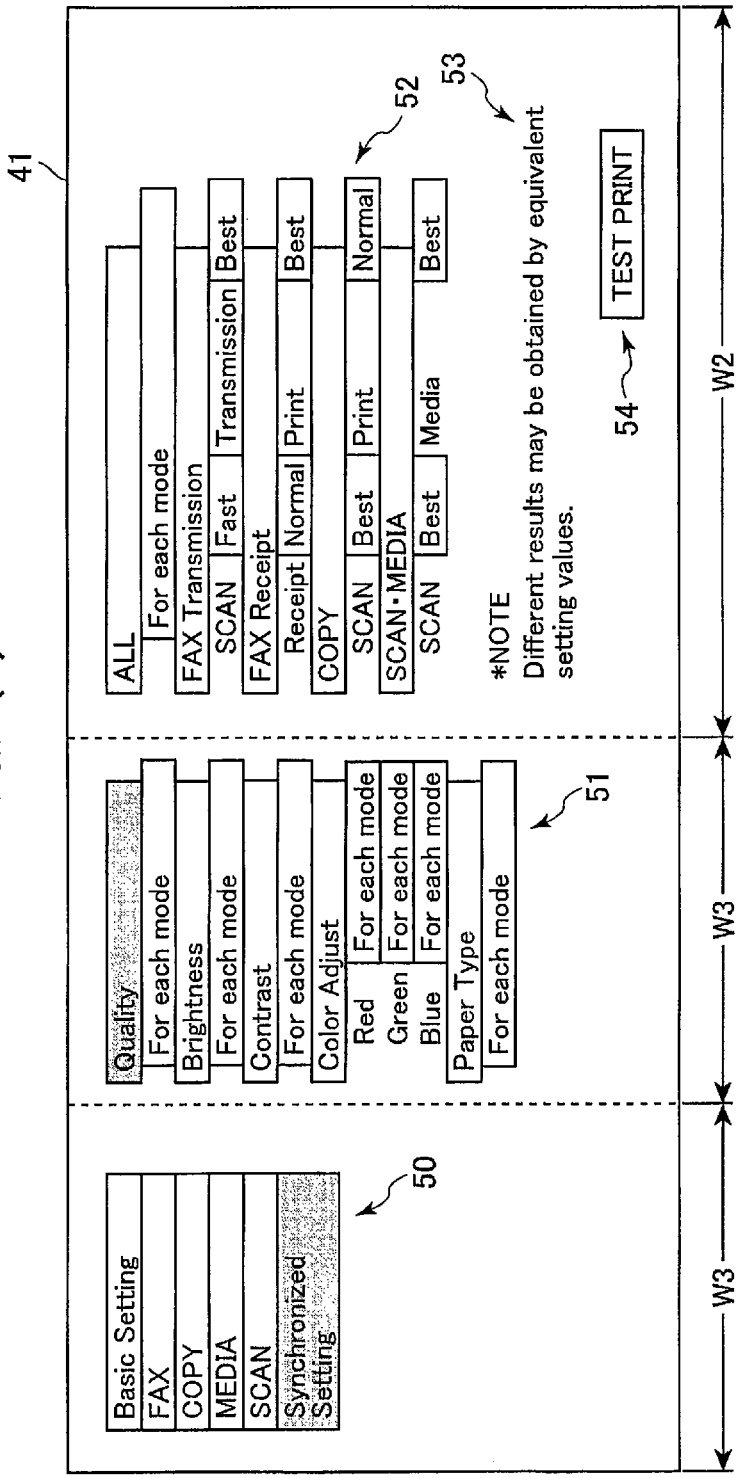
FIG. 5(a) is a diagram showing a screen of the LCD displaying a lower layer list of "Quality" on the right side of the lower layer list of "Synchronized Setting"

Next, description will be given in a case where "ALL" is selected in the lower layer list 52 of "Quality" shown in FIG. 5(a). In this case, as shown in FIG. 5(b), a lower layer list 55 of "ALL" is displayed on the right of the lower layer list 52 of "Quality".

The CPU 21 controls the LCD 41 to display lower layer list 55 of "ALL" in an area of the width W2 which is around half of the total width W1 of the LCD 41 and displays each of the initial menu list 50, the lower layer list 51 of "Synchronized Setting", and the lower layer list 52 of "Quality" which are previously displayed in an area of a width W4 which is around one-sixth of the total width W of the LCD 41. In addition, "ALL" in the lower layer list 52 of "Quality" is highlighted so that the user can check the selected menu at a glance.

The lower layer list 55 of "ALL" displays "ALL", "FAST", "Normal", "Best", and "For each mode" in this order from the top thereof. "FAST" indicates a rank having a lowest resolution. "Normal" indicates a rank having a resolution higher than "FAST". "Best" indicates a rank having a highest resolution, higher than "Normal". "FAST", "Normal", and "Best" in the lower layer list 55 indicates that the setting values for the facsimile function, the copy function, the scanner function, and the media function are set at once by selecting one of "FAST", "Normal", and "Best". On the other hand, "For each mode" indicates that the setting values for the facsimile function, the copy function, the scanner function, and the media function are set individually.

When the lower layer list 55 of "ALL" is displayed, the user operates the direction keys 40c (up and down directions) to set the cursor on a desired menu. Then, the user presses the selection key 40d in a state where the cursor is set at the desired menu.

Next, with reference to FIG. 6(a), a description will be given in a case where "Normal" is selected in the lower layer list 55 of "ALL" shown in FIG. 5(b). In this case, the ranks of Quality (resolution) for all the functions are set to "Normal".

That is, the ranks of Quality (resolution) for all the functions stored in the processing condition memory 24a are updated to "Normal". Also, a screen on the LCD 41 rewrites the ranks of Quality (resolution) for all the functions as "Normal". More specifically, the screen on the LCD 41 rewrites all of each rank of "SCAN" and "Transmission" in "FAX Transmission", each rank in "Reception" and "Print" in "FAX Receipt", each rank in "SCAN" and "Print" in "COPY", and each rank in "SCAN" and "Media" in "SCAN/MEDIA" as "Normal". In this case, only a letter of "N" of "Normal" is displayed as shown in FIG. 6(a) on the LCD 41. In the above manner, conditions with respect to a plurality of the functions can be set to the same condition easily at once without an error, in accordance with an instruction from the user.

In other words, the CPU 21 is configured to set a condition to each of the functions at a time, the conditions set to the functions being associated with one another with respect to the rank and the setting condition (a resolution, brightness, and a hue, for example) so that the functions treat image data with same concept (rank).

Next, with reference to FIG. 6(b), a description will be given when the rank of Quality (resolution) of one specific function is changed to another rank from the state where all of the ranks of Quality (resolution) are set to "Normal" as described above.

Figure 6A:
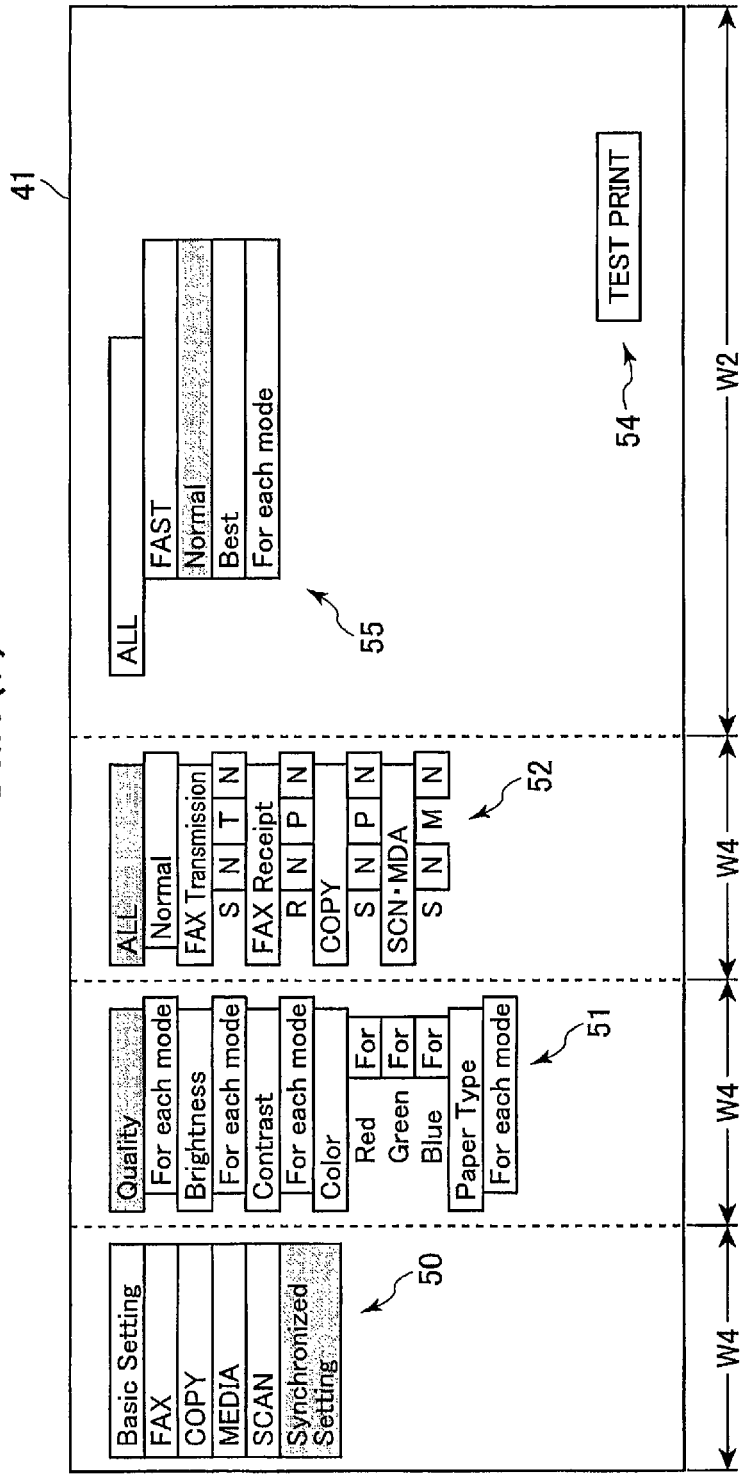
FIG. 6(a) is a diagram showing a screen of the LCD when ranks of Quality for all functions are set to "Normal"

The user selects "For each mode" in the lower layer list 55 of "ALL" shown in FIG. 6(a). In this manner, as shown in FIG. 6(b), the lower layer list 55 of "ALL" is hidden from the LCD 41 and only the initial menu list 50, the lower layer list 51 of "Synchronized Setting", and the lower layer list 52 of "Quality" are displayed in this order from the left of a screen of the LCD 41.

In this state, the user can clearly understand that the ranks of Quality (resolution) for all of the functions are set and displayed to "Normal" in the lower layer list 52 of "Quality".

The user operates the direction keys 40c (up and down direction) to set the cursor at a position that requires change of the rank in the lower layer list 52 of "Quality", and presses the selection key 40d. For example, the user is set the cursor at a position showing the rank of "SCAN" in "SCAN/MEDIA" and press the selection key 40d.

Figure 7:
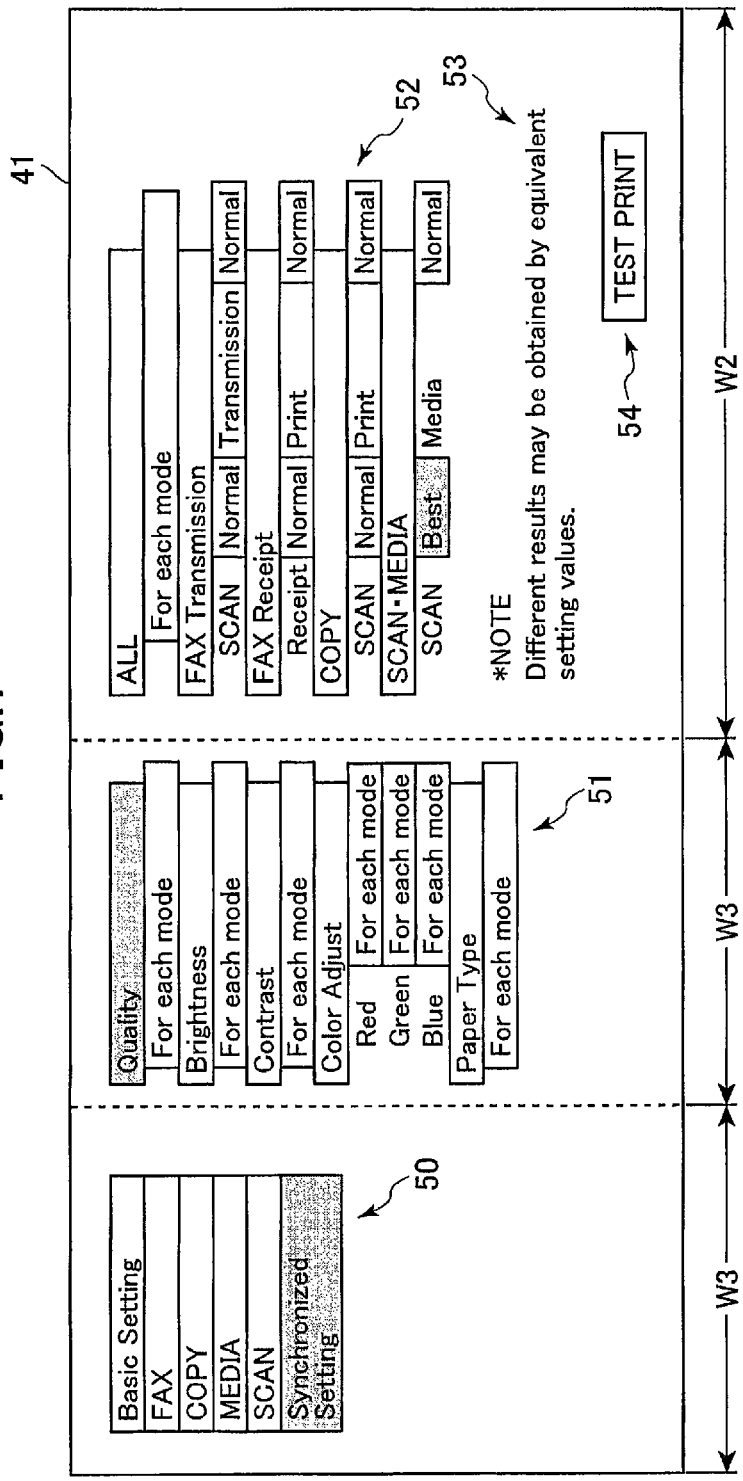
FIG. 7 is a diagram showing a screen of the LCD when a rank of "SCAN" in "SCAN/MEDIA" is updated from "Normal" to "Best"

In this case, the rank of "SCAN" in "SCAN/MEDIA" is updated from "Normal" to "Best" as shown in FIG. 7. Further, a content of the processing condition memory 24a is updated from "Normal" to "Best" for the scanner function. By pressing the selection key 40d repeatedly at the same position, three ranks of "Fast", "Normal", and "Best" are updated sequentially. In this manner, the usability is improved since only one of the functions can also be set to another rank.

Figure 8:
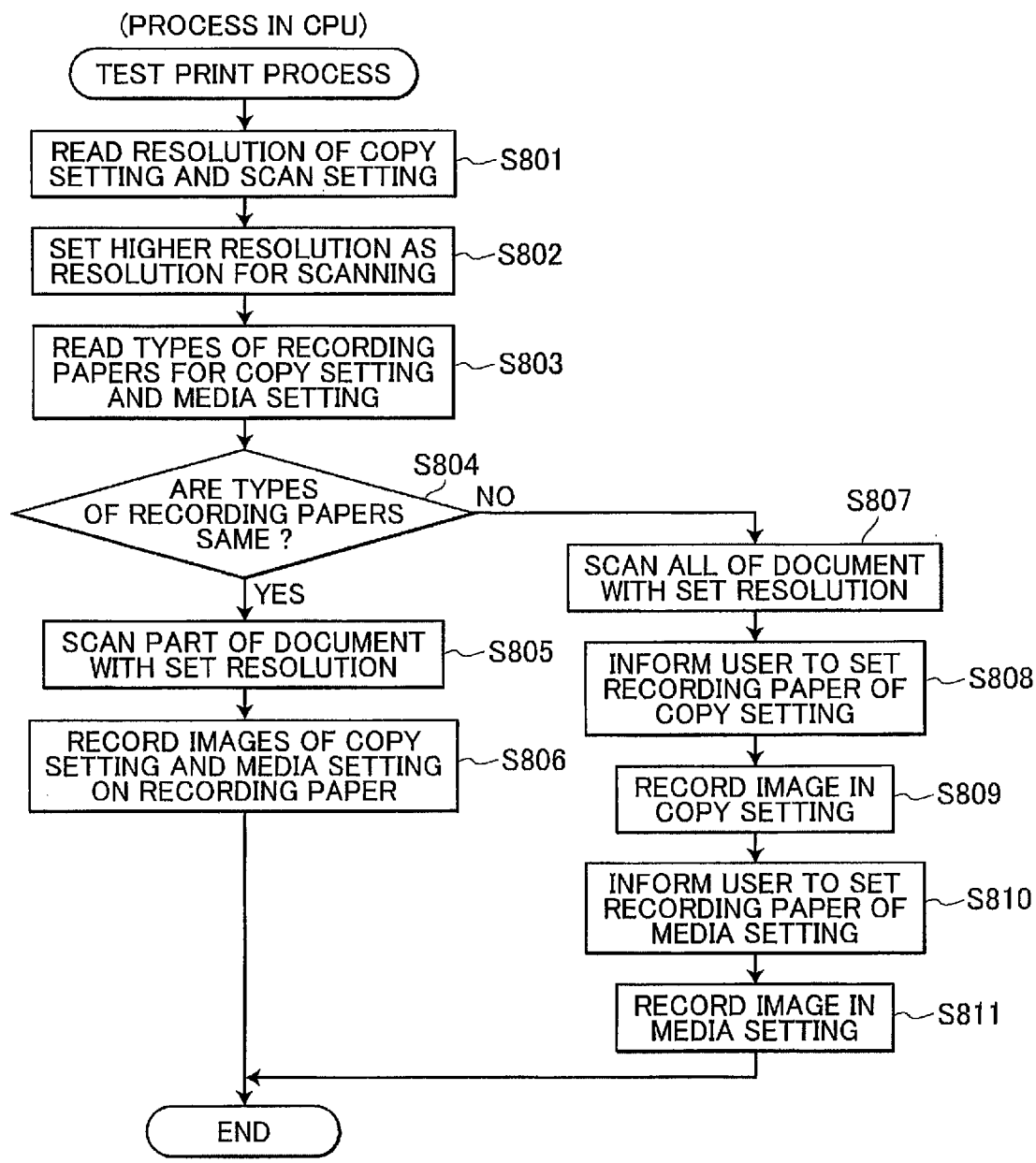
FIG. 8 is a flowchart of a test print process.
Figure 9A:
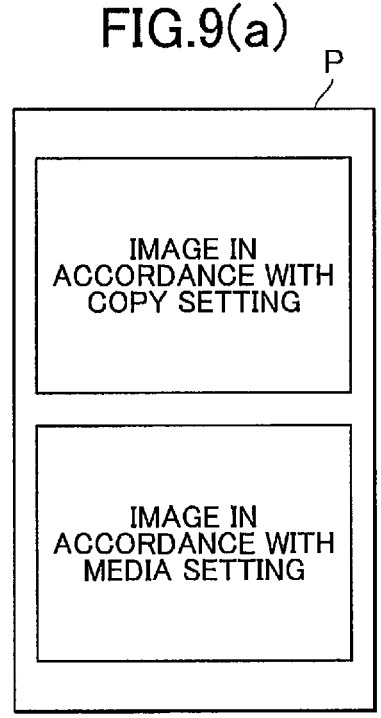
FIG. 9(a) shows a recording paper on which both of an image of a copy setting and an image of a media setting are recorded.
Figure 9:
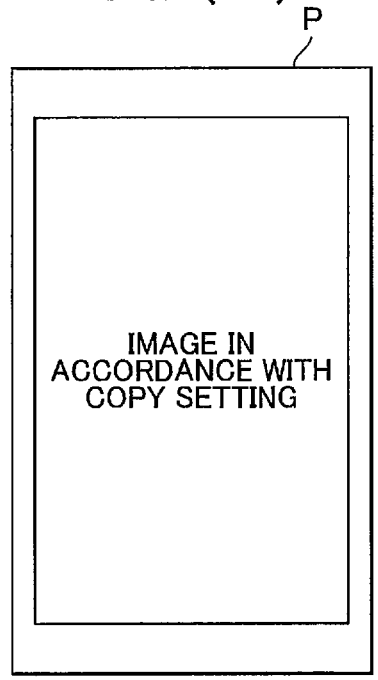
FIG. 9(b1) shows a recording paper on which an image of the copy setting is recorded.
Figure 9:
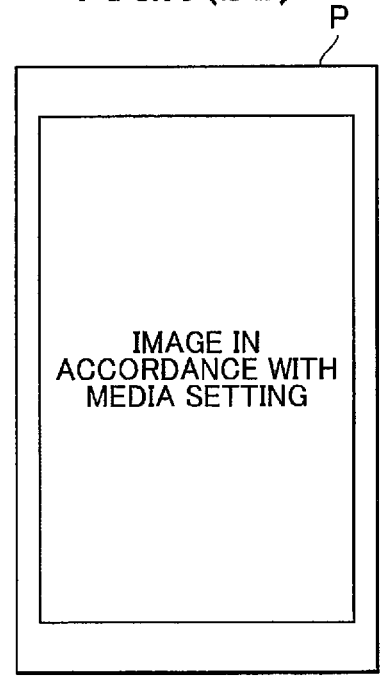

Next, "Test print" will be described in detail with reference to FIGS. 8 to 9(b2). FIG. 8 is a flowchart of the test print process. FIGS. 9(a)-9(b2) indicate the recording paper P having an image printed thereon in the test print process. The test print process is executed when the user selects "Test print" displayed on the LCD 41 in the menu screen display process described above.

In the embodiment, "Test print" is selected, then the user is requested to place a document. The user places the document. After the CPU 21 checks existence of the document, the test print process is executed.

In the test print process, in S801 the CPU 21 reads a resolution (a resolution of the Copy setting) set with respect to the Copy function and a resolution (a resolution of the Scan setting) set with respect to the scanner function from the processing condition memory 24a. In S802 the CPU 21 compares both of the readout resolutions with each other, and the CPU 21 set higher one of the resolutions as a resolution for scanning.

Since, the higher resolution is set as the resolution for scanning, as described above, the image data created with this resolution for scanning can always fit to the print function in the COPY function.

On the other hand, in a conceivable case where a lower resolution is set as the resolution for scanning, a following problem occurs. In this conceivable case, scanning is carried out with a lower resolution. If the resolution of the copy setting is higher than the resolution of the scanner setting, image data created with the resolution of the scan setting (lower setting). Thus, the created image data cannot be fit to the resolution for the copy setting (higher resolution), and the image cannot be recorded with the resolution set in the copy function. The embodiment described above prevents this problem.

With respect to the resolution of the copy function, both a scan resolution and a print resolution can be considered.

Alternatively, the resolution of the scan function, and the scan resolution and the print resolution of the copy function are compared, and the highest resolution of these may be set as the resolution for scanning.

Further, the resolution for the scan function may be set as follows. That is, the CPU 21 compares the resolution of the scan function to the scan resolution and the print resolution of the copy function. If at least any of the resolutions of the copy function are lower than the resolution of the scan function, the resolution of the scan function is set as the resolution for scanning. If both of the resolutions of the copy function are higher than the resolution of the scan function, the lower resolution between the two resolutions of the copy function is set as the resolution for scanning. In other words, the CPU 21 compares the resolution of the scan function to the scan resolution of the copy function and compares the resolution of the scan function to the print resolution of the copy function. If at least one of the scan resolution of copy function and the print resolution of the copy function is lower than the resolution of the scan function, the CPU 21 set the resolution of the scan function as the resolution for scanning. If both of the scan resolution of copy function and the print resolution of the copy function is higher than the resolution of the scan function, the CPU 21 sets the lower resolution between the scan resolution of copy function and the print resolution of the copy function as the resolution for scanning. In this case, a size of the image data can be made somewhat smaller.

Further, the scan resolution of the copy function may always be set to be higher than the print resolution of the copy function. In this case, the CPU 21 compares the resolution of the scan function to the scan resolution of the copy function. The CPU 21 sets the higher resolution between the resolution of the scan function to the scan resolution of the copy function as the resolution for the scanning.

Next, in S803 the CPU 21 reads a type of recording paper set for the copy function (a type of recording paper of the copy setting) and a type of recording paper set for the media function (a type of recording paper of Media setting) from the processing condition memory 24*a*. Then, in S804 the CPU 21 determines whether or not the both read types of recording paper (the type of recording paper set for the copy function and the type of recording paper set for the media function) are same.

If the CPU 21 determines that both of the types of recording paper are the same type of recording paper (S804: Yes), in S805 the CPU 21 creates image data by scanning a part of the document with the resolution set in S803.

Based on the created image data, in S806, as shown in FIG. 9(*a*), an image in accordance with the Copy setting is recorded in an upper part of the recording paper P, an image in accordance with the Media setting is printed in a lower part of the recording paper P, and then the CPU 21 ends the process.

The user can take a look at the recording paper P, and compare the image in accordance with the Copy setting to the image in accordance with the Media setting. Even if both of the images are set in the same rank, quality of the images may be different due to the reasons on specifications of devices. The user can check such difference in quality. In addition, the images are recorded on one sheet of the recording paper P, and both images can be easily compared by taking a look at the images. Also, wasting of recording paper and ink can be restricted.

On the other hand, the CPU 21 determines that the type of recording paper of the Copy setting and the type of recording paper of the Media setting are not the same type of recording paper (S804: No), in S807 image data is created by scanning the document with the resolution set in S803.

Then, in S808 the user is informed to place the recording paper P set in the Copy function. When the recording paper P is confirmed to be placed, in S809 the image in accordance with the Copy setting is printed on the recording paper P being placed as shown in FIG. 9(*b*1).

Next, in S810 the user is informed to place the recording paper P set in the Media function. When the recording paper P is confirmed to be placed, in S811 the image in accordance with the Media setting is printed on the recording paper P placed as shown in FIG. 9(*b*2).

Accordingly, the user can compare by actually taking a look at the image in accordance with the Copy setting on the recording paper P as shown in FIG. 9(*b*1) and the image in accordance with the Media setting on the recording papers P as shown in FIG. 9(*b*2).

While the invention has been described in detail with reference to the above embodiment thereof, it would be apparent to those skilled in the art that various changes and modifications may be made therein without departing from the spirit of the invention.

In the embodiment described above, each of a resolution, brightness, contrast, and a hue as the processing conditions is classified into three ranks, "Fast", "Normal", and "Best", and each of the ranks is stored for each of the functions. Alternatively, numerical values showing a degree of each of the resolution, the brightness, the contrast, and the hue may be stored in the processing condition memory 24*a*.

Figure 10:
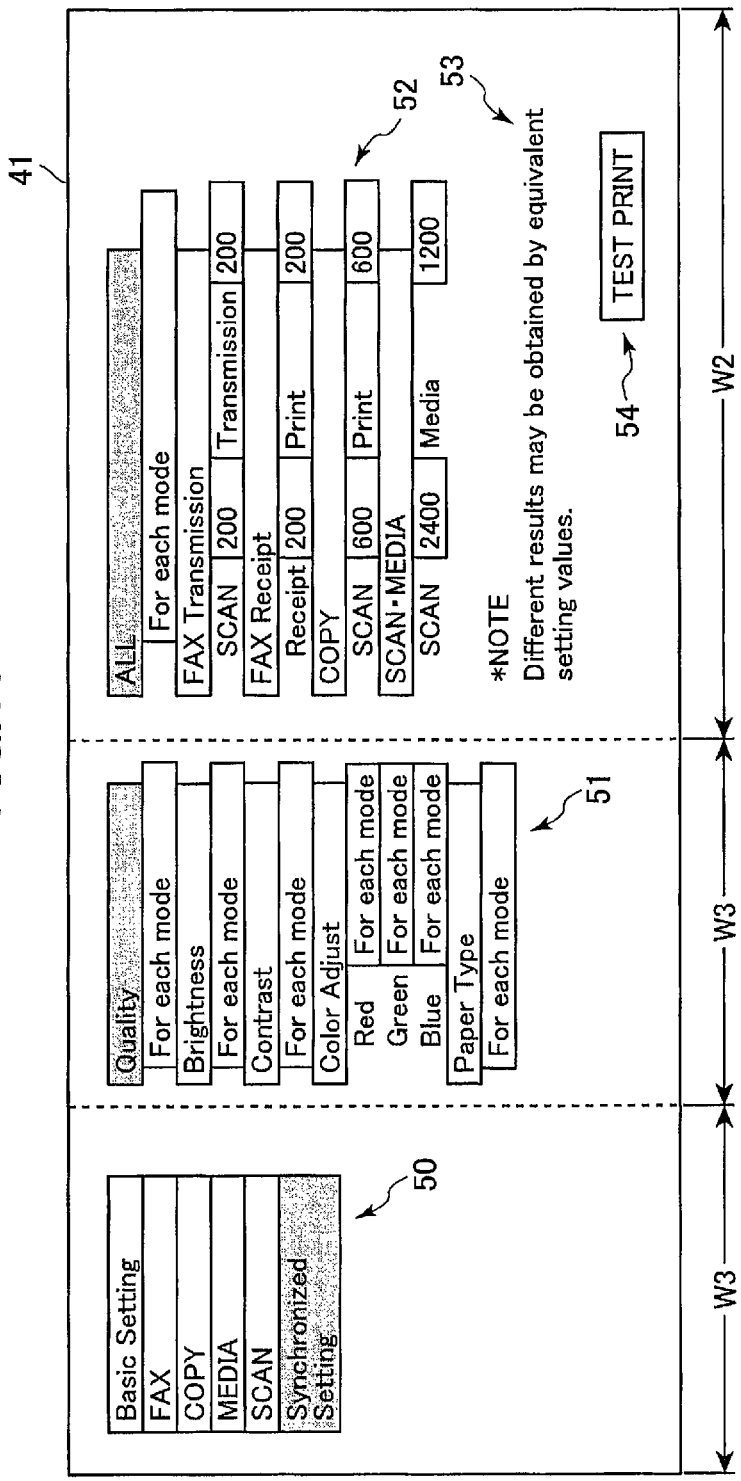
FIG. 10 shows a menu screen on the LCD according to a modification of the embodiment.

In this case, for example, as shown in FIG. 10 that corresponds to FIG. 5(*a*) of the embodiment, a specific numerical value is displayed in place of each of the ranks of "Fast", "Normal", and "Best". Accordingly, the user can set the processing conditions in each of the functions more in detail.

In addition, in the embodiment described above, levels or numerical values for the processing conditions can be set for each type of image quality such as a resolution, brightness, contrast, and a hue. Alternatively, the processing conditions may be set for a plurality of types of image quality at once. For example, in "Dark", the brightness is considered to be set to be moderate, and the contrast is considered to be set to be deep.

Alternatively, the configuration may be such that levels or numerical values for the processing conditions can be set with respect to more detailed items for each type of image quality including the resolution, the brightness, the contrast, and the hue. For example, the brightness may include intensity and contrast as the setting items. The user sets intensity and contrast as the setting items.

The processing condition memory may store, for each function, ranks with at least one parameter by which the multifunction device 1 performs one of functions corresponding to the parameter. For example, "Fast" rank of the resolution for the scanner function for copy has a parameter value indicative of the resolution of the image. In other words, the processing condition memory 24*a* stores the processing condition (at least one parameter value) classified into the rank.

Further, in the embodiment, the multifunction device 1 is described as the image data processing device of the invention. However, the invention is not limited to the multifunction device 1 as the image data processing device. The image data processing device of the invention may be a personal computer, a portable phone, a video player, a DVD player, a MD player, and a TV, for example, as long as such devices require the image data processing to be displayed. However, the invention is especially effective for a device having a small display device that displays the image data processing.

What is claimed is:

1. An image data processing device configured to perform at least two functions, the image data processing device comprising:

a plurality of image data treating units configured to treat image data, wherein each of the at least two functions is based on a processing combination of at least one of the plurality image data treating units, and wherein the at least two functions comprise a copier function and a scanner function;

a storing unit that stores a plurality of conditions relating to a property of image data to be treated by each of the image data treating units; and a setting unit configured to set, to each of at least two of the image data treating units corresponding to the at least two functions, a corresponding one of the plurality of conditions stored in the storing unit at a time, such that an operating condition for a processing combination of the copier function and an operating condition for the processing combination of the scanner function are set at the time, at least two of the plurality of conditions, each of which is set to the at least two of the image data treating units, being associated with one another so that the at least two of the image data treating units treat respective image data with a same concept of processing.

2. The image data processing device as claimed in claim 1, wherein the plurality of image data treating units includes:

a generating unit that generates image data under a first one of the plurality of conditions set by the setting unit;

an outputting unit that outputs data based on image data under a second one of the plurality of conditions set by the setting unit;

a transmitting unit that transmits image data under a third one of the plurality of conditions set by the setting unit; and a receiving unit that receives from an external device image data under a fourth one of the plurality of conditions set by the setting unit, wherein the first one of the plurality of conditions, the second one of the plurality of conditions, the third one of the plurality of conditions, and the fourth one of the plurality of conditions are associated with one another, such that the generating unit, the outputting unit, the transmitting unit, and the receiving unit treat respective image data with the same concept of processing.

3. The image data processing device as claimed in claim 1, wherein one of the plurality of conditions set by the setting unit includes a parameter having a value, wherein the storing unit stores parameter values, and the setting unit sets a same parameter value to the at least two of the image data treating units at a time.

4. The image data processing device as claimed in claim 3, wherein the parameters include at least one of three kinds:

a resolution parameter that sets a resolution of image data;

a brightness parameter that adjusts brightness of image data; and a hue parameter that adjusts hue of image data wherein the setting unit sets the same parameter value of a same kind to the at least two of the image data treating units.

5. The image data processing device as claimed in claim 3, wherein the parameter value is classified into ranks, wherein the storing unit stores the values classified into the rank, and wherein the setting unit sets a same rank to the at least two of image data treating units.

6. The image data processing device as claimed in claim 5, wherein each parameter includes at least one of three kinds:

a resolution parameter that sets a resolution of image data;

a brightness parameter that adjusts brightness of image data; and a hue parameter that adjusts hue of image data wherein the setting unit sets values classified into a same rank in a same kind of parameter to at least two of the image data treating units.

7. The image data processing device as claimed in claim 5, wherein when the setting unit sets values classified into a same rank in a same kind of parameter to at least two of the image data treating units and when a value set to one image data treating unit as the same rank in the same kind of parameter is different from a value set to another data treating unit as the same rank in the same kind of parameter, the display unit displays information indicating that the value set to the one image data treating unit is different from the value set to the another image data treating unit.

8. The image data processing device as claimed in claim 1, further comprising:

a display unit that displays information;

an instruction receiving unit that receive an instruction from a user;

a control unit that controls the display unit to display a reception information to which an instruction from the user is reflected and a condition information that indicates each of the plurality of conditions set to the corresponding one of the plurality of image data treating units.

9. The image data processing device as claimed in claim 1, wherein the plurality of image units includes:

a scanner unit that scans image to generate image data based on a document set by a user under a first one of the plurality of conditions set to the scanner unit;

a recording unit that records image on a recording sheet based on image data stored in an external device under a second one of the plurality of conditions set to the recording unit;

a copying unit that records image to a recording sheet based on the image data generated by the scanner unit under a third one of the plurality of conditions set to the copying unit, wherein the first one of the plurality of conditions, the second one of the plurality of conditions, and the third one of the plurality of conditions are associated with one another, such that the scanner unit, the recording unit, and the copying unit treat image data with the same concept of processing, the image data processing device further comprising a testing unit that controls the scanner unit to generate image data corresponding to at least a part of image of the document, controls the recording unit to record an image on a recording sheet based on the image generated by the scanner unit data under the second one of the plurality of conditions set to the recording unit, and controls the copying unit to record an image on a recording sheet based on the image data generated by the scanner unit under the third one of the plurality of conditions set to the copying unit.

10. The image data processing device as claimed in claim 9, wherein each of the plurality of conditions includes a type of recording sheets, wherein the setting unit sets the type of recording sheet for the recording unit to one of at least two types of recording sheets and set the type of recording sheet for the copying unit to one of at least two types of recording sheets, the image data processing device further comprising a determining unit that determines whether a same type of recording sheet is set to the recording unit and the copying unit, wherein when the determining unit determines that a same type of recording sheet is set to the recording unit and the copying unit, the testing unit records both an image in the second one of the plurality of conditions set to the recording unit and an image in the third one of the plurality of conditions set to the copying unit on one recording sheet.

11. The image data processing device as claimed in claim 9, wherein each of the plurality of conditions includes a resolution,
wherein the setting unit set the resolution for the recording unit to one of at least two resolutions and the resolution for the copying unit to one of the at least two resolutions,
the image data processing device further comprising a resolution detecting unit that detects highest resolution between the resolution set for the recording unit and the resolution set for the copying unit;
wherein the testing unit controls the scanning unit to scan at least a part of image based on the highest resolution detected by the resolution detecting unit.

12. The image data processing device as claimed in claim 1, further comprising a changing unit that changes at least one of conditions set to one of the plurality of image data treating units after the setting unit sets conditions to at least two of the image data treating units at a time.

13. An image data processing device comprising:
a plurality of image data treating units that treats image data;
a storing unit that stores a plurality of conditions relating to a property of image data to be treated by each of the image data treating units; and
a setting unit that is configured to set one of the plurality of conditions stored in the storing unit to each of at least two of the image data treating units at a time, the plurality of conditions, each of which is set to the at least two of the image data treating units, being associated with one another so that the at least two of the image data treating units treat respective image data with a same concept of processing,
wherein the plurality of image units includes:
a scanner unit that scans image to generate image data based on a document set by a user under a first one of the plurality of conditions set to the scanner unit;
a recording unit that records image on a recording sheet based on image data stored in an external device under a second one of the plurality of conditions set to the recording unit;
a copying unit that records image to a recording sheet based on the image data generated by the scanner unit under a third one of the plurality of conditions set to the copying unit,
wherein the first one of the plurality of conditions, the second one of the plurality of conditions, and the third one of the plurality of conditions are associated with one another, such that the scanner unit, the recording unit, and the copying unit treat image data with the same concept of processing,
wherein the image data processing device further comprises a testing unit that controls the scanner unit to generate image data corresponding to at least a part of image of the document, controls the recording unit to record an image on a recording sheet based on the image generated by the scanner unit data under the second one of the plurality of conditions set to the recording unit, and controls the copying unit to record an image on a recording sheet based on the image data generated by the scanner unit under the third one of the plurality of conditions set to the copying unit,
wherein each of the plurality of conditions includes a type of recording sheets,
wherein the setting unit sets the type of recording sheet for the recording unit to one of at least two types of recording sheets and set the type of recording sheet for the copying unit to one of at least two types of recording sheets,
the image data processing device further comprising a determining unit that determines whether a same type of recording sheet is set to the recording unit and the copying unit,
wherein when the determining unit determines that a same type of recording sheet is set to the recording unit and the copying unit, the testing unit records both an image in the second one of the plurality of conditions set to the recording unit and an image in the third one of the plurality of conditions set to the copying unit on one recording sheet.

14. An image data processing device comprising:
a plurality of image data treating units that treats image data;
a storing unit that stores a plurality of conditions relating to a property of image data to be treated by each of the image data treating units; and
a setting unit that is configured to set one of the plurality of conditions stored in the storing unit to each of at least two of the image data treating units at a time, the plurality of conditions, each of which is set to the at least two of the image data treating units, being associated with one another so that the at least two of the image data treating units treat respective image data with a same concept of processing,
wherein the plurality of image units includes:
a scanner unit that scans image to generate image data based on a document set by a user under a first one of the plurality of conditions set to the scanner unit;
a recording unit that records image on a recording sheet based on image data stored in an external device under a second one of the plurality of conditions set to the recording unit;
a copying unit that records image to a recording sheet based on the image data generated by the scanner unit under a third one of the plurality of conditions set to the copying unit,
wherein the first one of the plurality of conditions, the second one of the plurality of conditions, and the third one of the plurality of conditions are associated with one another, such that the scanner unit, the recording unit, and the copying unit treat image data with the same concept of processing,
wherein the image data processing device further comprises a testing unit that controls the scanner unit to generate image data corresponding to at least a part of image of the document, controls the recording unit to record an image on a recording sheet based on the image generated by the scanner unit data under the second one of the plurality of conditions set to the recording unit, and controls the copying unit to record an image on a recording sheet based on the image data generated by the scanner unit under the third one of the plurality of conditions set to the copying unit,
wherein each of the plurality of conditions includes a resolution, wherein the setting unit set the resolution for the recording unit to one of at least two resolutions and the resolution for the copying unit to one of the at least two resolutions, the image data processing device further comprising a resolution detecting unit that detects highest resolution between the resolution set for the recording unit and the resolution set for the copying unit;

wherein the testing unit controls the scanning unit to scan at least a part of image based on the highest resolution detected by the resolution detecting unit.

* * * * *